3,234,820
TRANSMISSION
Robert M. Tuck and James J. Mooney, Jr., Indianapolis, and Mark E. Fisher, Carmel, Ind., assignors to General Motors Corporation, Detroit, Mich., a corporation of Delaware
Original application Nov. 25, 1957, Ser. No. 698,620, now Patent No. 3,101,011, dated Aug. 20, 1963. Divided and this application Nov. 9, 1962, Ser. No. 236,529
10 Claims. (Cl. 74—688)

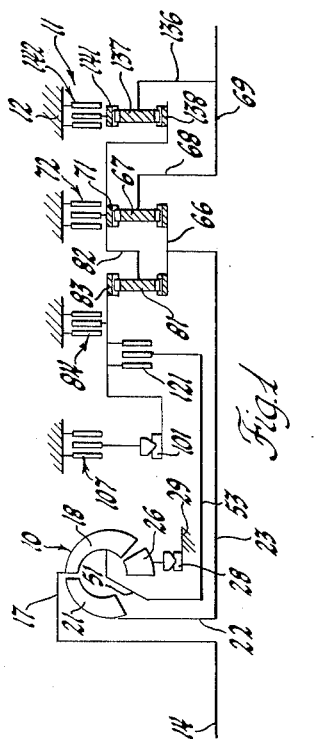

This invention relates to a multiratio transmission and more particularly a transmission having a torque converter, a multiratio gear unit and is a division of the inventors' application Serial Number 698,620, filed November 25, 1957, now Patent 3,101,011.

The transmission employs a torque converter and a multiratio gear set providing three forward ratios and reverse connected in series. The multiratio gear unit is preferably of the planetary type having a dual sun gear input and a dual carrier output. Low ratio is provided by holding the first ring gear. Intermediate ratio may be provided by directly holding a second ring gear of this compound planetary gear set for a direct drive or by holding the second ring gear through a one-way brake for a free wheel drive. A third ratio split torque drive is provided when the input is connected through a damping device located in the eye of the torque converter and a clutch to the second ring gear to provide one torque path, in combination with normal input drive through the torque converter to the sun gears to provide another torque path. Reverse is obtained by holding the ring gear of the reverse gear set.

An object of the invention is to provide in a multiratio transmission having a torque converter and a multiratio gear unit connected in series, a connection from the input directly to the one element of a differential gear unit and a connection through the torque converter to another element of the differential gear unit to provide a split torque drive.

Another object of the invention is to provide in a transmission, a multiratio differential gear unit, a torque converter output connected to another element of the planetary gear unit, and an input member connected by a damping device located in the eye of the torque converter directly to one element of the planetary differential gear unit to provide a split torque drive.

Another object of the invention is to provide in a transmission having a torque converter and a multiratio differential gear unit connected in series, a first drive in which the torque converter output is connected to one element of the differential gear unit, the transmission output is connected to another element of the differential gear unit and the third element is held and a second split torque drive in which the third element is released and directly connected to the transmission input member.

Another object of the invention is to provide in a transmission including a first two-way drive and a second one-way drive having the same ratio and a third two-way drive having a higher ratio, and control means operative on movement to a drive position to first engage said first drive and after a predetermined time delay engage said second drive and operative on a shift to another drive position to disengage said first drive and to continue engagement of said second and third drives.

These and other objects of the invention will be more apparent from the following description and drawings showing a preferred embodiment of the invention.

FIGURE 1 shows the torque and gearing diagrammatically.

FIGURE 2 shows the transmission assembly in section.

The transmission comprises a torque converter unit 10 and a three ratio and reverse gear unit 11 mounted in a housing 12. The input or engine shaft 14 is connected by a flex plate 16 which is dished to permit relative axial movement between the engine shaft and the torque converter housing 17. The torque converter housing carries the impeller blades 18 which pump fluid around the torus chamber to the turbine member 19 where the fluid acts on the turbine blades 21 to drive the turbine member which is connected through the hub 22 to drive the torque converter output or intermediate shaft 23. The fluid circulating around the converter torus is then redirected by the stator blades 26 which are mounted on a hub 27 connected by the one-way brake device 28 to the ground sleeve 29 secured by pin 31 to the housing 12. The forward wall 33 of the torque converter housing 17 has a central pilot bearing portion 34 fitting into a bore 36 in the end of the shaft 14 to rotatably support the converter housing. A bearing 35 is mounted within the bearing portion to rotatably support the turbine hub 22 and the shaft 23. These plain bearings permit converter housing 17 and pilot bearing 34 and the hub 22 to slide axially with respect to each other and engine shaft 14. The forward wall of the torque converter housing 33 has a plurality of radial fins 38 which pump fluid radially outwardly in the same manner as the impeller blades 18 to balance the pressures on both sides of the turbine member 19 to reduce the axial thrust.

The torque converter housing 17 has an inner shell portion 41 attached to the impeller blades 18 which provides a positive drive for the split torque drive. The shell 41 has a portion 42 extending over the stator blades 26 to provide an inner shell for the stator blade and to provide a semi-circular recess to receive a plurality of damper springs 43. Each pair of springs is located between a pair of abutment portions 44 on the shell 41 with a tongue 46 located between each pair of springs. The tongues 46 are mounted on a hub 47 which has a portion 48 forming the remainder of the inner shell above the stator, a strut portion 51 connected across the torque converter torus chamber having a cross section to provide the least interference with the flow of the fluid, and an inner hub portion 52 splined to the sleeve shaft 53, which as described below provides the connection between the input member and the gearing for the split torque drive. The torque converter housing 17 extends inwardly to the hub 56 which is connected to drive the input pump 58 by a sleeve 57 and suitable splines permitting relative axial movement of housing 17.

The elements of the torque converter are axially located by a thrust washer 61 located between the hub 56 and the one-way brake 28, a thrust washer 62 located between the one-way clutch and the hub 52, a thrust washer 63 between the turbine hub 22 and the front wall 33, and thrust surfaces 64 on the hub 52 and hub 22. The hubs 22 and 52 and the freewheeler 28 are respectively slidably mounted on the shafts 23, 53 and ground sleeve 29. Thus, the parts of the converter are normally located in the position shown and expansion of the converter housing is permitted in either direction.

*Gearing*

The torque converter output shaft 23 drives the low and intermediate sun gear 66 which meshes with the low planetary pinions 67 mounted on a carrier 68 on the output shaft 69. Planetary pinions 67 mesh with ring gear 71 whose rotation is retarded and stopped to effect low ratio drive by a ratio engaging connecting device 72 which in this instance is a gear reaction brake. The ratio engaging device 72 consists of a plurality of plates 73 located between a fixed abutment 74 formed as a portion of the housing 12 and a movable abutment 75 splined to the housing 12 with alternate plates splined to ring gear 71 and intermediate plates splined to the housing 12. A fluid motor 76 consisting of an L-shaped annular piston 77 mounted on an L-shaped cylinder 78 engages the inner edge of an annular spring lever 79 to swing the annular lever about its outer edge which is pivoted to the housing 12 so that an intermediate portion engages the movable abutment 75 to apply the ratio engaging device 72.

The sun gear 66 also has a portion which may be of the same diameter meshing with the pinions 81 mounted on the intermediate carrier 82 which is secured by suitable splines to the ring gear 71. Pinions 81 also mesh with the intermediate ring gear 83 which may be retarded by the ratio engaging connecting device 84 which in this case is a gear reaction brake. This device since the reaction is less than the reaction on the low ratio ring gear 71 may consist of one rotatable plate 86 splined to the ring gear 83, the fixed abutment 87 formed as a portion of the housing 12 and a movable abutment 88 splined to the housing 12. The intermediate ratio engaging device 84 is actuated by a fluid motor 91 having an L-shaped annular piston 92 mounted on a similar cylinder 93. The piston 92 has a plurality of thrust portions 94 engaging the movable plate 88. The annular spring lever 96 which is pivoted at its outer edge to the housing 12 has a plurality of fingers extending between the thrust portions to retract the piston.

The intermediate ratio may also be established through a one-way brake 101 which has an inner race sleeve 102 connected by a clutch housing 103 splined to abutment 124 welded to the ring gear 83. The one-way brake has an outer race 104 formed as a portion of the hub 106 which may be retarded by a ratio engaging connecting device 107 which consists of a plurality of plates 108 with alternate plates splined to the hub 106 and intermediate plates splined to the housing 12 located between the fixed abutment 109 on the housing 12 and an axially movable abutment 111 splined to the housing 12. The ratio engaging connecting device 107 is actuated by a fluid motor 112 consisting of a piston 113 located in the cylinder 114 formed in housing 12. The piston 113 engages the inner edge of a slotted annular retraction spring having its outer edge anchored to the housing 12. Thrust portions 117 on the piston 113 extend through slots in the annular spring 116 to engage the end plate 111.

The split torque drive in high ratio is provided by connecting the input driven shaft 53 by a ratio engaging connecting device or ratio clutch 121 to a ring gear 83. The ratio engaging device 121 has a plurality of plates 122 with alternate plates connected to the housing 103 and thus ring gear 83 and intermediate plates connected to a hub 123 formed on or connected to the input driven shaft 53. The plates are located between the abutment 124 fixed to the housing 103 and the movable abutment 126 splined to the housing 103. The housing 103 and the extension of inner race sleeve 102 cooperate to provide a cylinder 127 for the piston 128 which engages the movable plate 126. A centrifugal type vent valve 129 opens while pressure is being reduced in the piston 128 due to centrifugal force to more rapidly vent the cylinder 127. A retraction spring 132 located between the piston 128 and the abutment portion 133 on sleeve 102 retracts the piston.

Reverse ratio is provided by a reverse gear set which includes a carrier 136 splined to the output shaft 69 and having a plurality of planetary pinions 137 meshing with a sun gear 138 connected by a hub 139 to the ring gear 71 and carrier 82 and also meshing with a reverse ring gear 141 which may be held by the ratio engaging connecting device 142 to establish reverse ratio. The ratio drive engaging device 142 consists of a plurality of plates 143 with alternate plates splined to the ring gear 141 and intermediate plates splined to the housing 12 located between a fixed abutment 144 on the housing 12 and a movable abutment 146 splined to the housing 12. This drive device 143 is actuated by a fluid motor 147 consisting of a piston 148 located in a cylinder 149 formed in the housing 12. The piston 148 engages the inner edge of an annular spring lever 151 which is pivoted at its outer edge to the housing 12 and has an intermediate portion engaging the movable plate 146.

The rear pump 153 is supported on the rear wall 154 of the housing 12. The pump 153 may also support the pitot tube 156 located in the pitot can 157 which is full of fluid and rotatably mounted by hub 158 on the output shaft 69. This pitot governor assembly may be used to provide a governor pressure from pitot tube 156 for the control system.

The low ratio engaging device 72 is engaged to hold the ring gear 71 and effect a low ratio drive through the torque converter driven shaft 23 to drive the output shaft 69 at a reduced gear ratio. In intermediate ratio the ring gear 83 is held either positively by ratio engaging device 84 or through the one-way brake 101 to provide a freewheeling drive when only the ratio engaging device 107 is employed. When the ring gear 83 is held the drive is through the torque converter to the torque converter output shaft 23 and sun gear 66 which rotates the planetary carrier 82 and ring gear 71 at an intermediate speed so that sun gear 66 driving the pinions 67 and carrier 68 in conjunction with a moving ring gear 71 rotates the output shaft 69 at an intermediate speed.

High ratio drive is a split torque drive with part of the power or torque flow passing through the torque converter by the action of the impeller blades 18 and the turbine blades 21 to the converter output shaft 23 and part of the power passing by direct mechanical connection from the input shaft 14, converter housing 17 and the damping device located in the eye of the torque converter housing to the direct drive shaft 53. The torque converter output shaft 23 drives the sun gear 66, and the direct drive shaft 53, when the ratio engaging device 121 is engaged, drives the ring gear 83 to provide a split torque drive substantially at 1 to 1 ratio when the converter is operating in the coupling range.

The hydraulic control system has a pump 58 supplying a regulated pressure or a pump and regulator valve connected to main line 169.

The manual valve 266 connects the main line 169 in reverse range R to the reverse clutch line 271, in drive range DR to the drive range line 272, in intermediate range INT to intermediate clutch line 273, and in low range LO to the low clutch line 274. The valve 266 has an element 276 having lands $a$, $b$, $c$ and $d$ of equal diameter located in a bore 277. A series of annular grooves 278 located between the lands $b$ and $c$ cooperate with a detent 279 to resiliently position the valve in each of the range positions R, N, DR, INT and LO. The main line 169 is connected to the bore 277 between the lands $a$ and $b$ in all positions of valve element 276, and thus is continuously connected by ports 281 and a central bore 282 through the valve element 276 to the space between the lands $c$ and $d$. In the reverse position illustrated the space between the lands $c$ and $d$ is connected to the reverse line 271 to supply fluid to reverse ratio engaging device 142. Similarly moving the valve to the other range positions DR, INT and LO connects the space between the lands $c$ and $d$ to supply fluid respectively to drive range line 272, intermediate line 273 and low line 274. In neutral the space between the lands $c$ and $d$ is blocked. In all positions the lines not connected to the main line 169 by the space between the lands $c$ and $d$ are exhausted via exhaust 286 or 287 at the open end of the bore 277.

The drive relay valve 291 connects either the intermediate clutch line 273 or the drive range line 272 to the intermediate and drive range line 219–322 without interconnecting the intermediate clutch line and drive range line, so that in both intermediate and drive range positions of the manual selector valve, main line fluid is supplied to the intermediate and drive range line 219–322. The drive relay valve 291 has a valve element 292 located in a closed bore 293 and a spring 294 seated at one end of closed bore and engaging the valve element 292 to urge the valve to the position connecting the drive range line 272 to a branch 296 of the intermediate and drive range line 219–322. In this position valve element 292 blocks communication between the intermediate clutch line 273 and either intermediate and drive range line 219–322 or drive range line 272. When the manual valve is shifted to intermediate position main line fluid entering intermediate clutch line 273 enters the closed end of bore 293 and moves the valve element 292 to the intermediate position against the force of spring 294 connecting intermediate clutch line 273 to intermediate and drive range line 219–322 and blocks branch 296 so that the drive range line 272 cannot communicate with either line 219–322 or line 273.

The intermediate high shift valve 298 controls the automatic upshift in drive range from intermediate ratio to high ratio in accordance with output shaft speed and throttle pedal position. The intermediate high shift valve 298 has a valve element 299 having lands $a$, $b$ and $c$ located in a stepped bore 301. Land $c$ has a larger diameter than land $b$ and is located in the larger portion of the stepped bore 301 to provide an unbalanced area acted on by the high clutch fluid for the hysteresis action which delays a downshift. The bore is closed at the end adjacent land $a$ and connected to governor line 167 so that governor pressure acts on the end of land $a$ to urge the valve from the intermediate to the high position. The space between the lands $a$ and $b$ is connected to the exhaust port 302 to prevent leakage past lands $a$ and $b$. With the valve element 299 in the intermediate position shown in FIG. 2c, the drive range line 272 is blocked by the land $c$ and pressure in the high clutch line 303–362 is connected between the lands $b$ and $c$ to exhaust 304. When the valve element 299 moves to the high ratio position the exhaust 304 is closed by the land $b$ and the drive range line 272 is connected between the lands $b$ and $c$ to the high clutch line 303–362.

The throttle pressure line 215 from throttle valve 236 is connected so fluid acts on the land $c$ of valve element 299 and with spring 316 moves the valve toward the intermediate position against the governor pressure from line 167.

The manual valve 266 may then be shifted from neutral to the range positions indicated below to establish the ratios "X" as shown in the following table and described below.

Intermediate range operation

In intermediate ratio the manual selector valve is moved to the INT or intermediate range position in which the main line 169 is connected to the intermediate clutch or range line 273 which supplies fluid to the direct drive intermediate ratio engaging device 84 for a two-way drive. The intermediate clutch line 273 is also connected to the relay valve 291 and moves the valve element 292 down against the spring 294, connecting the intermediate clutch line 273 to the intermediate drive range line 219–322.

Drive range operation

In drive range an automatic shift is provided between intermediate freewheel drive and split torque high ratio drive. When the manual selector valve 266 is moved to the drive range position main line 169 will be connected to the drive range line 272 supplying the intermediate high shift valve 298 which would normally be in the downshift position shown, blocking line 272. Line 272 is also connected through the relay valve 291 to the intermediate drive range line 219–322.

On a shift from intermediate range to drive range the freewheel intermediate ratio device 107 will remain engaged as intermediate clutch line 273 is disconnected and drive range line 272 connected by drive relay valve 291 to intermediate drive range line 219–322. Valve 291 changes these connections quickly without any appreciable loss of pressure in ratio device 107.

Since the freewheeling intermediate ratio engaging device 107 is not engaged in low ratio, it will be engaged on a shift from low to drive range to pick up the drive during engagement.

When the manual valve 266 is moved from low range to drive range the low ratio device 72 is disengaged by exhausting low clutch line 274 at exhaust 287 and connecting main line 169 to drive range line 272. Drive range line 272 is connected to the intermediate high shift valve 298 which in the low speed position shown blocks the flow and is connected to the drive relay valve 291 which connects this line to the intermediate drive range line 219–322.

When the transmission is operating in drive range an increase in speed or a decrease in throttle position may shift the intermediate high valve 298 to place the transmission in split torque high ratio. When the valve upshifts the drive range line 272 will be connected between the lands $b$ and $c$ to the high clutch line 303–362.

Reverse range operation

For reverse drive the manual valve 266 is moved to the R or reverse position connecting the main line 169 to reverse line 271, the other range lines being connected to exhaust 287.

| Manual valve position | Gear ratio | Ratio devices | | | | |
|---|---|---|---|---|---|---|
| | | 121, split torque drive | 107, freewheel int. | 84, direct int. | 72, low | 142, rev. |
| LO | First | | | | X | |
| INT | Second | | X | X | | |
| DR | Freewheel int. | | X | | | |
| | Split torque dr. | X | X | | | |
| N | Neutral | | | | | |
| R | Reverse | | | | | X |

Low range operation

In low range the manual selector valve 266 is moved to the LO or low range position indicated in FIG. 2c in which the main line 169 having the regulated pressure is connected to the low clutch or range line 274 which supplies fluid to the low ratio engaging device 72 for manual control of low ratio. The other range lines are then connected to exhaust 286 or 287.

The above described preferred embodiment is illustrative of the invention which may be modified within the scope of the appended claims.

We claim:
1. In a multiratio transmission, a fixed housing, an input member, an intermediate member, an output member, a torque converter having a pump connected to said input member, a turbine connected to said intermediate member and a stator, means connecting said stator di- rectly to said fixed housing to prevent reverse rotation and hold said stator fixed during torque multiplication by said torque converter, sun gear means driven by said intermediate member, a first carrier connected to said output member having first pinions meshing with said sun gear means, a first ring gear meshing with said first pinions, a second carrier connected to said first ring gear having second pinions meshing with said gun gear means, a second ring gear meshing with said second pinions, first control means operatively connected to said first ring gear to retard rotation of said first ring gear and said second carrier to establish one ratio, second control means operatively connected to said second ring gear to retard rotation of said second ring gear and to establish a second ratio, third control means including a one-way device operatively connected to said second ring gear to retard rotation of said second ring gear in one direction to establish a one-way freewheeling drive in said second ratio, and fourth control means connecting said input member to said second ring gear to establish a third ratio.

2. In a multiratio transmission, a fixed housing, an input member, an intermediate member, an output member, a torque converter having a pump connecting to said input member, a turbine connected to said intermediate member and a stator, a first one-way brake mounting said stator directly on said housing, sun gear means driven by said intermediate member, a first carrier connected to said output member having first pinions meshing with said sun gear means, a first ring gear meshing with said first pinions, a second carrier connected to said first ring gear having second pinions meshing with said sun gear means, a second ring gear meshing with said second pinions, first control means operatively connected to said first ring gear to retard rotation of said first ring gear and said second carrier to establish one ratio, second control means operatively connected to said second ring gear to retard rotation of said second ring gear and to establish a second ratio, third control means including a second one-way brake operatively connected to said second ring gear to retard rotation of said second ring gear in one direction to establish a one-way freewheeling drive in said second ratio, and clutch means located coaxially between said second and third control means connecting said input member to said second ring gear to establish a split torque drive in a third ratio.

3. In a multiratio transmission, an input member, an intermediate member, an output member, a torque converter having a pump connected to said input member and a turbine connected to said intermediate member and a stator, a multiratio transmission gear unit operatively connecting said input and said intermediate member to said output member and having first ratio establishing means selectively operative for connecting said intermediate member to said output member in a two-way drive in a first ratio, second ratio establishing means selectively operative for connecting said input member to said output member to provide a two-way drive in a second ratio, third ratio establishing means selectively operative for connecting said input member to said output member to provide a one-way freewheel drive in said second ratio, and fourth ratio establishing means selectively operative for connecting said input member and said intermediate member to said output member to establish a split torque drive in a third ratio, and operating means connected to said first, second, third and fourth ratio establishing means to operate in a first range said first ratio establishing means to establish said first ratio to simultaneously operate in a second range said second and third ratio establishing means to establish said two-day drive in said second ratio, and to operate in a third range said third ratio establishing means individually to establish said one-way drive in said second ratio and said third and fourth ratio establishing means simultaneously to establish said split torque drive.

4. In a transmission, an input member, an intermediate converter drive member and an intermediate direct drive member and an output member, a torque converter having a pump element driven by said input member, a turbine element driving said intermediate converter drive member to provide a fluid damped converter drive and a stator element, said elements having inner wall portions defining a central annularly extending eye of the converter, a hub connected to said intermediate direct drive member and extending between said elements into said eye and damper means located in said eye and connected to said pump member and said hub within said eye to provide a damped direct drive.

5. The invention defined in claim 4 and differential gearing connecting said intermediate converter drive member and said intermediate direct drive member to said output member to provide a split torque drive.

6. The invention defined in claim 4 and said damper means including abutments mounted on the inner surface of said inner wall portion of said pump in the eye of the torque converter, abutments on said hub located between said abutments on said pump and drive damping means between said abutments to transmit drive and damp torsional vibration.

7. The invention defined in claim 4 and said inner wall portion of said pump being semicircular in section and having diametrically opposed portions of the semicircular inner wall portion of the pump, and said damper means including a plurality of pairs of abutments fixed on said portions of said inner wall portion and extending into said eye, a plurality of fingers connected to said hub located radially between the abutments of each pair of abutments and located circumferentially between adjacent pairs of abutments, a pair of springs located between each finger and the adjacent pair of abutments on each side of each finger, said springs being located and guided by said semicircular inner wall portion of said pump.

8. In a transmission, an input member, an intermediate converter drive member and an intermediate direct drive member and an output member, a torque converter having a pump driven by said input member, a turbine driving said intermediate converter drive member to provide a fluid damped converter drive and a stator, said pump turbine and stator having inner wall portions defining a central annularly extending eye of the converter, the inner wall of said pump having abutments extending into said eye, a hub member connected to said intermediate direct drive member and extending between said turbine and stator having a plurality of fingers between said abutments in said eye, resilient means mounted on the inner wall of said pump member between said abutments and fingers in said eye resiliently positioning said hub member with respect to said pump member to provide a damped mechanical drive from said pump member to said intermediate direct drive member, differential gearing connecting said intermediate converter drive member and said intermediate direct drive member to said output member to provide a split torque drive.

9. In a multiratio transmission, an input member, an output member, sun gear means driven by said input member, a first carrier connected to said output member having first pinions meshing with said sun gear means, a first ring gear meshing with said first pinions, a second carrier connected to said first ring gear having second pinions meshing with said sun gear means, a second ring gear meshing with said second pinions, first control means operatively connected to said first ring gear to retard rotation of said first ring gear and said second carrier to establish one ratio, second control means operatively connected to said second ring gear to retard rotation of said second ring gear and to establish a second ratio, third control means including a one-way brake operatively connected to said second ring gear to retard rotation of said second ring gear in one direction to establish a one-way freewheeling drive in said second ratio, fourth control means connecting said input member to said second ring gear to establish a third ratio, and actuating means connected to said first, second, third and fourth control means to operate said first control means in a first range, to operate said second and third control means in a second range and to operate said third and fourth control means in a third range.

10. In a multiratio transmission, an input member, an output member, sun gear means driven by said input member, a first carrier connected to said output member having first pinions meshing with said sun gear means, a first ring gear meshing with said first pinions, a second carrier connected to said first ring gear having second pinions meshing with said sun gear means, a second ring gear meshing with said second pinions, first control means operatively connected to said first ring gear to retard rotation of said first ring gear and said second carrier to establish one ratio, second control means operatively connected to said second ring gear to retard rotation of said second ring gear and to establish a second ratio, third control means including a one-way brake operatively connected to said second ring gear to retard rotation of said second ring gear in one direction to establish a one-way freewheeling drive in said second ratio, fourth control means connecting said input member to said second ring gear to establish a third ratio, and actuating means connected to said first, second, third and fourth control means to operate said first control means in a first range to simultaneously operate said second and third control means in a second range, and to operate said third control means individually and said third and fourth control means simultaneously in a third range.

References Cited by the Examiner

UNITED STATES PATENTS

| | | | |
|---|---|---|---|
| 2,324,713 | 7/1943 | McFarland | 74—765 |
| 2,519,022 | 8/1950 | Burtnett | 74—688 |
| 2,592,537 | 4/1952 | Burtnett | 74—765 |
| 2,623,409 | 12/1952 | Herndon et al. | 74—688 |
| 2,640,572 | 6/1953 | O'Brien | 74—731 |
| 2,856,794 | 10/1958 | Simpson | 74—732 X |
| 2,861,474 | 11/1958 | Moore | 74—688 |
| 2,889,715 | 6/1959 | De Lorean | 74—688 |
| 2,919,607 | 1/1960 | Moore | 74—688 |

DON A. WAITE, *Primary Examiner.*